(No Model.)
C. HOOPER.
BICYCLE TIRE.
No. 589,434. Patented Sept. 7, 1897.
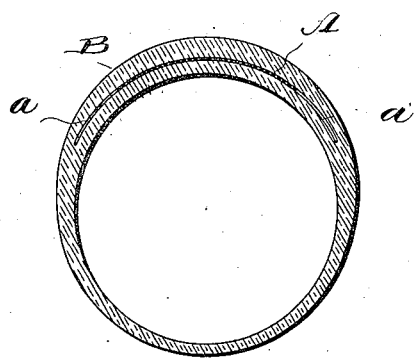
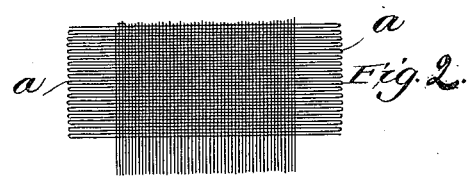
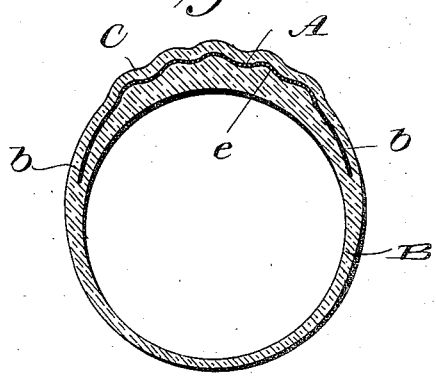
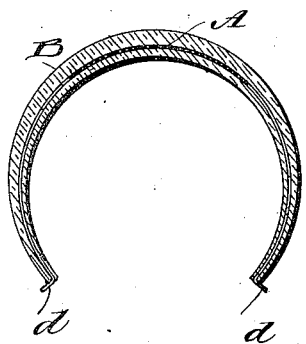
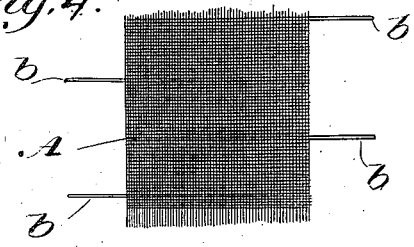
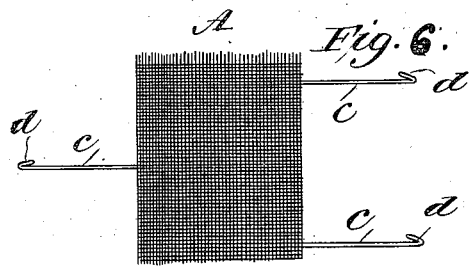
Witnesses:
L. C. Hills.
E. H. Bond
Inventor:
Charles Hooper,
By E. B. Stocking, Atty.

UNITED STATES PATENT OFFICE.

CHARLES HOOPER, OF PORT NORFOLK, VIRGINIA.

BICYCLE-TIRE.

SPECIFICATION forming part of Letters Patent No. 589,434, dated September 7, 1897.

Application filed August 14, 1896. Serial No. 602,712. (No model.)

*To all whom it may concern:*

Be it known that I, CHARLES HOOPER, a citizen of the United States, residing at Port Norfolk, in the county of Norfolk, State of Virginia, have invented certain new and useful Improvements in Bicycle-Tires, of which the following is a specification, reference being had therein to the accompanying drawings.

This invention relates to certain new and useful improvements in tires for bicycles and other wheeled vehicles; and it has for its objects, among others, to provide a cheap, light, flexible, and non-puncturable tire.

It has been heretofore proposed to provide the tire with a metallic guard or protector, which, however, has been of necessity of such rigidity as to destroy the requisite flexibility of the tire.

I aim to provide a tire that shall be fully as flexible and pliable as an ordinary rubber tube, and rendered non-puncturable by reason of the presence of a ribbon of aluminium or other wire woven sufficiently tight to prevent openings or mesh of sufficient size to receive the point of a tack or other sharp instrument. This aluminium ribbon adds nothing to the weight of the tire. The ribbon may be of greater or less width and has portions extended laterally either continuously or at intervals, as may be preferred, which extended portions serve to add strength to the tire without impairing its flexibility or its pneumatic principle, and also aid materially in preventing bursting of the tire. In the form of tire known as the "clencher" tire the portions are extended and bent so as to fit in the lock of the tire, which will tend to strengthen the tire and prevent its being torn in the lock. In tires having a corrugated tread portion the ribbon may be correspondingly corrugated. The ribbon is molded in the tire and is protected and prevented from corroding or being otherwise affected by moisture or other causes.

Other objects and advantages of the invention will hereinafter appear in the following description, and the novel features of the invention will be particularly pointed out in the appended claims.

The invention is clearly illustrated in the accompanying drawings, which, with the letters of reference marked thereon, form a part of this specification, and in which—

Figure 1 is a section through the tire, showing portions of the ribbon extended laterally. Fig. 2 is a view of a portion of such ribbon. Fig. 3 is a section through a tire having a corrugated tread portion. Fig. 4 is a view of a portion of the ribbon employed in such cases. Fig. 5 is a section through a clencher-tire, and Fig. 6 is a view of a portion of the ribbon employed in the form of tire seen in Fig. 5.

In carrying out my invention I construct a ribbon of fine tough wire of suitable material, preferably aluminium, on account of its lightness and durability. This wire is woven into a ribbon A, of any desired width, say from one to one and one-half inches, the wire being woven very closely, so that the meshes shall be minute to prevent the passage of any substance between the wires, the wires being of course disconnected at their points of intersection, so as to give as much flexibility and pliability to the ribbon as possible. This ribbon is placed in the mold so that when the rubber is run in the same will blow into the minute meshes of the wire ribbon and the ribbon will become embedded in the rubber tire B and form practically an integral or homogeneous part thereof, being free to give and yield with the same under the motions of the rider.

When made of aluminium, it is estimated that the weight of the tire will not be materially increased, as the aluminium will weigh practically no more than the rubber whose place it occupies.

As seen in Figs. 1 and 2, the ribbon has its transverse strands or wires extended, as seen at *a*, and these may be extended any desired length, but practically substantially the proportion illustrated will be found sufficient. These are sufficient to prevent cutting of the tire along the edges of the ribbon and materially strengthen the tire and tend to prevent bursting thereof, or in lieu of the form shown in Fig. 2 I may sometimes employ the form of ribbon illustrated in Fig. 4, in which, instead of having a continuous series of wires extended, as at *a* in Fig. 2, a single wire may be extended, as seen at *b* in said Fig. 4, and this alternating upon opposite sides of the ribbon, as indicated. These in many instances will form a sufficient hold to give the required strength to the tire and tend to decrease the liability of bursting. When employed in a clencher-tire, as seen in Fig. 5, these extended portions may be of greater length, as seen at c in Fig. 6, and alternately disposed, as shown, with their outer ends bent at an angle, as seen at d, and projected through the rubber at the opposite ends of the tire, as indicated in Fig. 5, so as to fit in the lock of the tire, as will be readily understood, and not only strengthen the tire at this point, but prevent its being torn in the lock.

In Fig. 3 I have shown the aluminium applied to a tire having a corrugated tread portion C, the ribbon being corrugated in a plane substantially parallel with the corrugations of the tire and the ribbon having extended portions b, which may be like those indicated in Fig. 4, or a greater number of wires may be extended and embedded in the rubber of the tire, after the form shown in Fig. 2.

In all of the forms shown the same generic idea is involved, and it will be understood that in all of such forms the ribbon is to be woven sufficiently tight to prevent passage of points of tacks or glass or other sharp articles through the tire.

Modifications in detail may be resorted to without departing from the spirit of the invention or sacrificing any of its advantages.

Having thus described my invention, what I claim as new, and desire to secure by Letters Patent, is—

1. As an improved article of manufacture, a non-puncturable shield for a pneumatic tire composed of closely-woven wire having the transverse strands thereof extended beyond the longitudinal strands, substantially as described.

2. As an improved article of manufacture, a non-puncturable shield for a pneumatic tire composed of closely-woven wire having the transverse strands thereof extended beyond the longitudinal strands and alternately disposed upon opposite sides of the closely-woven portion, substantially as described.

In testimony whereof I affix my signature in presence of two witnesses.

CHARLES HOOPER.

Witnesses:
J. S. CRAWFORD,
S. T. BARCLAY.